United States Patent
Homma et al.

(10) Patent No.: US 7,982,190 B2
(45) Date of Patent: Jul. 19, 2011

(54) RADIATION DETECTOR AND METHOD FOR PRODUCING THE SAME

(75) Inventors: Katsuhisa Homma, Otawara (JP); Hitoshi Chiyoma, Otawara (JP); Shinetsu Fujieda, Kawasaki (JP); Keiko Sakai, Tokyo (JP); Masakuni Ikagawa, Tokyo (JP); Akiko Suzuki, Tokyo (JP)

(73) Assignee: Toshiba Electron Tubes & Devices Co., Ltd., Tochigi-ken (JP)

(*) Notice: Subject to any disclaimer, the term of this patent is extended or adjusted under 35 U.S.C. 154(b) by 0 days.

(21) Appl. No.: 12/782,209

(22) Filed: May 18, 2010

(65) Prior Publication Data
US 2010/0224784 A1 Sep. 9, 2010

Related U.S. Application Data

(63) Continuation of application No. PCT/JP2008/071128, filed on Nov. 20, 2008.

(30) Foreign Application Priority Data

Nov. 20, 2007 (JP) ................................. 2007-300029

(51) Int. Cl.
*G01T 1/20* (2006.01)
*H01L 21/00* (2006.01)
(52) U.S. Cl. ............... 250/370.11; 250/361 R; 250/367; 257/E21.502; 438/64
(58) Field of Classification Search .................. 250/368, 250/361 R, 370.11, 483.1, 367; 257/E21.502; 438/64
See application file for complete search history.

(56) References Cited

U.S. PATENT DOCUMENTS

| | | | |
|---|---|---|---|
| 7,067,817 B2* | 6/2006 | Suganuma et al. | 250/370.11 |
| 7,514,686 B2* | 4/2009 | Ogawa et al. | 250/361 R |
| 2006/0033032 A1* | 2/2006 | Inoue et al. | 250/370.11 |
| 2007/0045554 A1* | 3/2007 | Wakamatsu et al. | 250/370.11 |
| 2007/0108634 A1* | 5/2007 | Higashi et al. | 257/787 |

FOREIGN PATENT DOCUMENTS

| | | |
|---|---|---|
| JP | 05-242841 | 9/1993 |
| JP | 3077941 | 8/2000 |
| JP | 2002-148395 | 5/2002 |
| JP | 2003-279656 | 10/2003 |
| WO | WO 01/51951 | 7/2001 |

OTHER PUBLICATIONS

International Search Report for PCT/JP2008/071128.

* cited by examiner

*Primary Examiner* — David P Porta
*Assistant Examiner* — Faye Boosalis
(74) *Attorney, Agent, or Firm* — Pillsbury Winthrop Shaw Pittman, LLP

(57) ABSTRACT

According to one embodiment, a radiation detector includes, a substrate, a scintillator layer, a moistureproof body, and an adhesion layer. The substrate comprises a photoelectric conversion element. The scintillator layer is formed on the substrate and converts radiation into fluorescence. The moistureproof body comprises a flange portion in a periphery thereof, the moistureproof body being deep enough to contain at least the scintillator layer. The adhesion layer causes the substrate and the flange portion of the moistureproof body to adhere to each other in a sealed manner.

16 Claims, 8 Drawing Sheets

RADIATION DETECTOR AND METHOD FOR PRODUCING THE SAME

CROSS-REFERENCE TO RELATED APPLICATIONS

This is a Continuation Application of PCT Application No. PCT/JP2008/071128, filed Nov. 20, 2008, which was published under PCT Article 21(2) in Japanese.

This application is based upon and claims the benefit of priority from Japanese Patent Application No. 2007-300029, filed Nov. 20, 2007; the entire contents of which are incorporated herein by reference.

FIELD

Embodiments described herein relate to a radiation detector that detects radiation and a method for producing the same.

BACKGROUND

A planar X-ray detector in which an active matrix is used is developed as a new-generation diagnostic X-ray detector. An X-ray photographic image or a real-time X-ray image is output as a digital signal by detecting an X-ray with which the X-ray detector is irradiated. In the X-ray detector, the X-ray is converted into visible light, that is, fluorescence by a scintillator layer, and the fluorescence is converted into a signal charge by a photoelectric conversion element such as an amorphous silicon (a-Si) photodiode and a CCD (Charge Coupled Device), thereby obtaining an image.

Generally, for example, cesium iodide (CsI):sodium (Na), cesium iodide (CsI):thallium (Tl), sodium iodide (NaI), and gadolinium oxysulfide ($Gd_2O_2S$) are used as a material for the scintillator layer. A groove is formed by dicing, or deposition is performed by an evaporation method such that a pillar structure is formed, which allows improvement of a resolution characteristic of the scintillator layer. As described above, various materials can be used for the scintillator, and different materials are used for different applications and necessary characteristics.

There is a method for forming a reflection layer on the scintillator layer in order to enhance use efficiency of the fluorescence from the scintillator layer to improve a sensitivity characteristic. That is, in the fluorescence emitted from the scintillator layer, the fluorescence travelling toward the opposite side to the photoelectric conversion element side is reflected by the reflection layer to increase the fluorescence reaching the photoelectric conversion element side.

For example, a method for depositing a metallic layer, such as a silver alloy and aluminum having a high fluorescent reflectance, on the scintillator layer and a method for applying and forming the light-scattering reflection layer containing a binder resin and a light-scattering material such as $TiO_2$ are well known as the reflection layer producing method. A method in which a reflection plate having a metallic surface made of aluminum and the like is not formed on the scintillator layer, but brought into close contact with the scintillator layer to reflect the scintillator light is also put to practical use.

A moistureproof structure that protects the scintillator layer and the reflection layer or the reflection plate from an outside atmosphere to prevent characteristic degradation caused by the humidity becomes an important constituent in an effort to make the radiation detector a practical product. Particularly high moistureproof performance is required when the CsI:Tl film or the CsI:Na film, which is of a material largely degraded by the humidity, is used as the scintillator layer.

For example, a method in which a poly-paraxylene CVD film with which the scintillator layer is covered is used as a moistureproof layer (for example, see Japanese Patent No. 3077941 (pages 3-4 and FIGS. 1 and 2)) and a method in which a cover adheres onto an enclosure member enclosing the surroundings of the scintillator layer with an adhesive agent to seal the scintillator layer while the enclosure member adheres onto a substrate with the adhesive agent (for example, see Jpn. Pat. Appln. KOKAI Publication No. 5-242841 (pages 3-5 and FIG. 1)) are disclosed as the conventional moistureproof structure.

However, there are following problems in the conventional moistureproof structure.

For the method in which the poly-paraxylene CVD film is used as the moistureproof layer, frequently a moisture transmission barrier characteristic is inadequate in at least a practical film thickness range (for example, 20 µm). In order to confirm the moistureproof performance, a sample in which the CsI:Tl film (thickness of 600 µm) that is the scintillator layer and the poly-paraxylene CVD film (thickness of 20 µm) that is the moistureproof layer are used on a glass substrate is made, and result of investigation of changes in luminance and resolution in a high-temperature and high-humidity test will roughly be described below.

In the method for measuring the luminance and the resolution, the X-ray was irradiated from the scintillator layer side, and an X-ray image was observed from the glass substrate side with a CCD camera by focusing on an interface between the glass substrate and the scintillator layer. The luminance was luminance relative to an intensifying screen (HG-H2 Back, product of Fujifilm Corporation), the resolution was obtained by measuring CTF (Contrast Transfer Function) of 2 Lp/mm from a resolution chart image, and the both were used as indexes.

For the sample produced in the above-described way, in a 60° C.-90% RH high-temperature and high-humidity life test, the change in luminance is small while the resolution was largely degraded, and a CTF (2 Lp/mm) value was decreased to about 80% of the initial state in 24 hours. After morphology was observed with a SEM as a phenomenon analysis of the decrease in resolution, it was found that, while the CsI:Tl film had the highly independent pillar structure in the initial state, fusion was generated between the pillars in the sample in which the resolution was degraded by the high-temperature and high-humidity test. This is attributed to the fact that a light guide effect is reduced by the fusion between the pillars to lead to the decrease in resolution.

For the structure in which the cover adheres onto the enclosure member enclosing the surroundings of the scintillator layer with the adhesive agent to seal the scintillator layer while the enclosure member adheres onto the substrate with the adhesive agent, generally the enclosure member is made of a material such as metal which has rigidity, a crack or peeling of an adhesive portion is easily generated in a reliability test of a cold cycle or thermal shock by a thermal expansion coefficient difference between the substrate and the enclosure member and between the cover and the enclosure member, and the moistureproof performance is fatally reduced. Because the adhesion and sealing are performed above and below the enclosure member, the amount of moisture transmitted through the resin adhesive agent is clearly increased when compared with the case of one adhesive portion.

In view of the foregoing, an object of the present invention is to provide a radiation detector that has the excellent moistureproof performance and the high reliability for the temperature change of the cold cycle or thermal shock and a method for producing the same.

DETAILED DESCRIPTION

In general, according to one embodiment, a radiation detector comprises, a substrate, a scintillator layer, a moistureproof body, and an adhesion layer. The substrate comprises a photoelectric conversion element. The scintillator layer is formed on the substrate and converts radiation into fluorescence. The moistureproof body comprises a flange portion in a periphery thereof, the moistureproof body being deep enough to contain at least the scintillator layer. The adhesion layer causes the substrate and the flange portion of the moistureproof body to adhere to each other in a sealed manner.

An embodiment will be described below with reference to the drawings.

Figure 1:
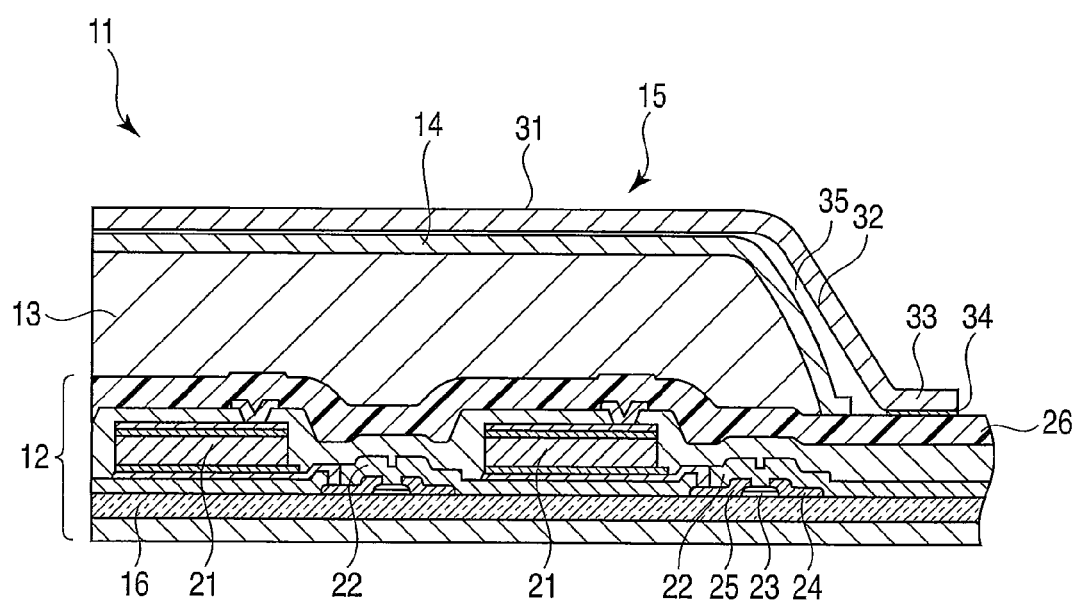
FIG. 1 is a sectional view illustrating a radiation detector according to an embodiment.
Figure 2A:
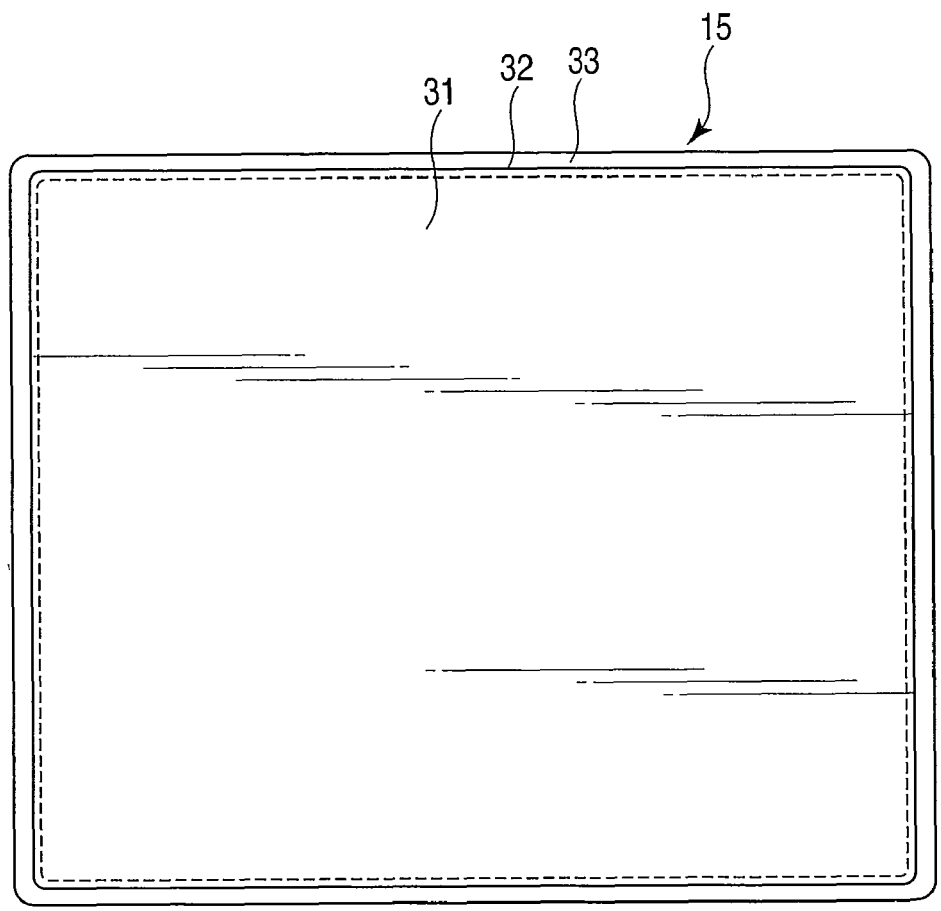
FIG. 2A is a front view illustrating a moistureproof body of the radiation detector.
Figure 2B:
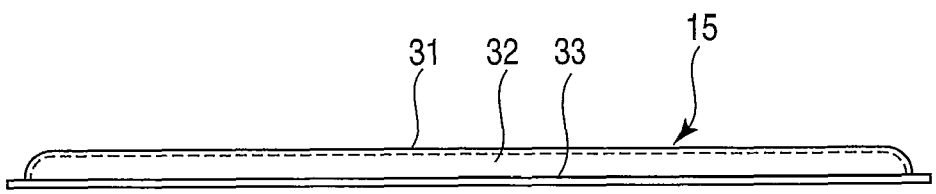
FIG. 2B is a side view illustrating the moistureproof body of the radiation detector.
Figure 3:
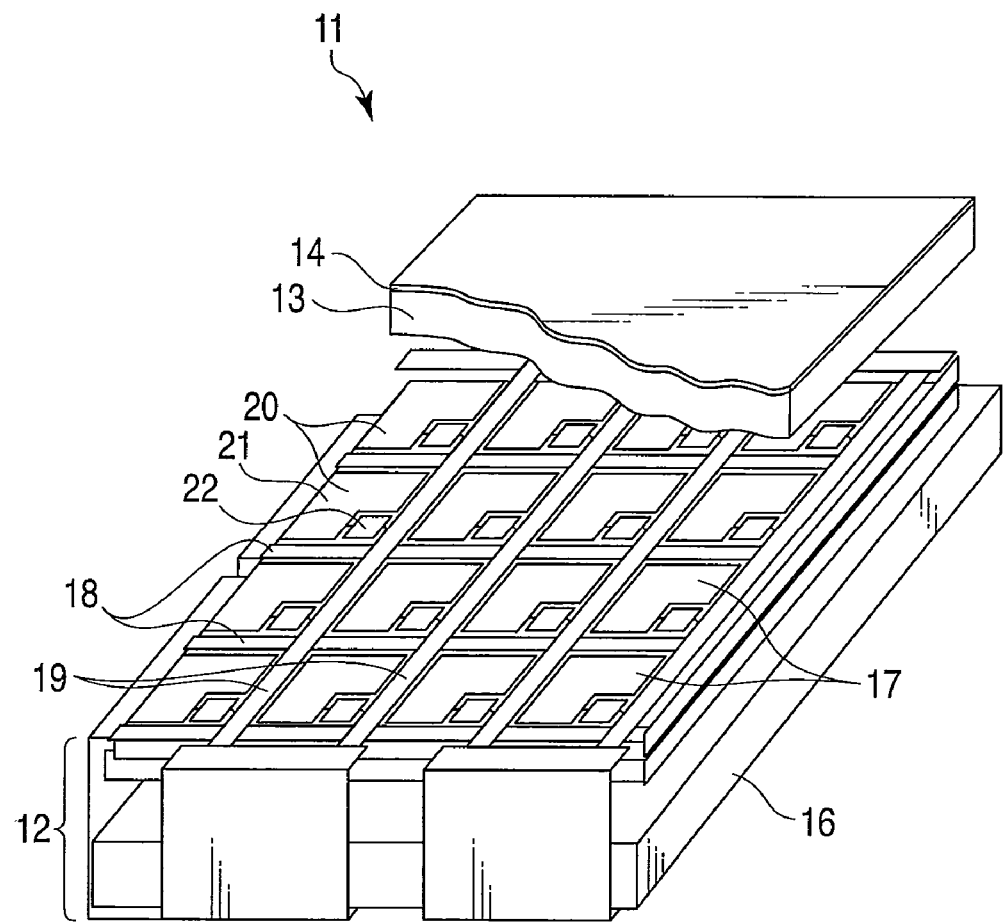
FIG. 3 is a perspective view of the radiation detector.

FIG. 1 is a sectional view of a radiation detector, FIGS. 2A and 2B are a front view and a side view of a moistureproof body of the radiation detector, respectively, and FIG. 3 is a perspective view of the radiation detector.

The numeral 11 designates an X-ray detector that is the radiation detector. The X-ray detector 11 is an X-ray planar sensor that detects an X-ray image that is a radiation image and, for example, used in a general medical purpose. The X-ray detector 11 comprises an array substrate 12, a scintillator layer 13, a reflection layer 14, and a hat-shaped moistureproof body 15. The array substrate 12 is a photoelectric conversion substrate that converts the fluorescence into an electric signal. The scintillator layer 13 is an X-ray conversion unit that is provided on a principal surface of the array substrate 12, and converts the incident X-ray into the fluorescence. The reflection layer 14 is provided on the scintillator layer 13 to reflect the fluorescence from the scintillator layer 13 onto the side of the array substrate 12. The hat-shaped moistureproof body 15 is provided on the array substrate 12 such that the scintillator layer 13 and the reflection layer 14 are covered therewith in order to protect the scintillator layer 13 and the reflection layer 14 from outside air or humidity.

The array substrate 12 converts the fluorescence, in which the scintillator layer 13 converts the X-ray into visible light, into the electric signal. The array substrate 12 comprises a glass substrate 16, plural photoelectric conversion units 17 having substantially rectangular shapes, plural control lines (or gate lines) 18, plural data lines (or signal lines) 19, a control circuit (not illustrated), and an amplification/conversion unit (not illustrated). The photoelectric conversion units 17 are provided on the glass substrate 16 to act as photosensors. The control lines 18 are provided along a row direction, and the data lines 19 are provided along a column direction. Each control line 18 is electrically connected to the control circuit. Each data line 19 is electrically connected to the amplification/conversion unit.

In the array substrate 12, pixels 20 having the same structure are formed into a matrix shape, and a photodiode 21 that is a photoelectric conversion element is provided in each pixel 20. The photodiodes 21 are provided below the scintillator layer 13.

Each pixel 20 comprises a thin-film transistor (TFT) 22 that is a switching element electrically connected to the photodiode 21 and an accumulation capacitor (not illustrated) that is a charge accumulation unit in which a signal charge converted by the photodiode 21 is stored. However, occasionally a capacitance of the photodiode 21 also acts as the accumulation capacitor, and it is not always necessary to provide the accumulation capacitor.

Each thin-film transistor 22 has a switching function of accumulating and emitting the charge that is generated by the incidence of the fluorescence to the photodiode 21. At least part of the thin-film transistor 22 is made of a semiconductor material such as amorphous silicon (a-Si) as an amorphous semiconductor that is a semiconductor material having crystallinity or a polysilicon (P—Si) that is a polycrystalline semiconductor. Each thin-film transistor 22 comprises a gate electrode 23, a source electrode 24, and a drain electrode 25. The drain electrode 25 is electrically connected to the photodiode 21 and the accumulation capacitor. The accumulation capacitor is formed into a rectangular, flat plate shape, and is provided below the photodiode 21 while being opposite the photodiode 21.

The control line 18 is provided along the row direction between the pixels 20, and is electrically connected to the gate electrode 23 of the thin-film transistor 22 of each pixel 20 in the same row.

The data line (signal line) 19 is provided along the column direction between the pixels 20, and is electrically connected to the source electrode 24 of the thin-film transistor 22 of each pixel 20 in the same column.

The control circuit controls an operating state of each thin-film transistor 22, that is, on and off of each thin-film transistor 22. The control circuit is mounted at a side edge long the row direction in the surface of the array substrate 12.

The amplification/conversion unit comprises plural charge amplifiers each of which is provided according to each data line 19, a parallel-series converter to which the charge amplifiers are electrically connected, and an analog-digital converter to which the parallel-series converter is electrically connected.

A resin protective layer 26 is formed on the surface of the array substrate 12.

The scintillator layer 13 converts the incident X-ray into the visible light, that is, the fluorescence. For example, the scintillator layer 13 is formed into a pillar structure by vacuum evaporation method using cesium iodide (CsI):thallium (Tl) or sodium iodide (NaI):thallium (Tl). Alternatively, gadolinium oxysulfide ($Gd_2O_2S$) fluorescent particles and a binder material are mixed together, applied onto the array substrate 12, and burned and hardened, and a groove portion is formed by dicing with a dicer, thereby forming the scintillator layer 13 into a square pillar shape. A gap between the pillars is filled with air or an inert gas such as nitrogen ($N_2$) for preventing oxidation, or the gap can be vacuum-encapsulated. In the following examples, a CsI:Tl evaporated film is used as the scintillator layer 13, the scintillator layer 13 has a thickness of about 600 μm, the pillar of the CsI:Tl pillar-structure crystal has a size of about 8 to about 12 μm in a top.

A surface portion 31 is formed in the hat-shaped moistureproof body 15 while being opposite the surface of the scintillator layer 13, a peripheral surface portion 32 is formed from a periphery of the surface portion 31 so as to have a depth containing the scintillator layer 13, and a flange portion 33 is formed while projected toward the periphery from a leading end side of the peripheral surface portion 32. The flange portion 33 is circularly formed while projected from the periphery of the moistureproof body 15, formed in parallel to the surface of the array substrate 12, and caused to adhere to the array substrate 12 in the sealed manner with an adhesion layer 34 interposed therebetween. It is not always necessary to bring the moistureproof body 15 into contact with the reflection layer 14, and usually a gap 35 exists between the moistureproof body 15 and the reflection layer 14.

Examples will be described below. In each example, as described above, for the final X-ray detector 11, the scintillator layer 13 and the reflection layer 14 are sequentially formed on the array substrate 12, and a peripheral circuit and a monitor are provided to observe the X-ray image. However, it takes huge expense and time when the X-ray detector 11 is formed in the final configuration for various kinds of test production. The following method is adopted in order to avoid the difficulty and simply evaluate change in luminance and resolution of the scintillator layer 13, that is, the moistureproof performance of the moistureproof structure in the high-temperature and high-humidity test. That is, the CsI:Tl scintillator layer 13 is formed on the glass substrate in which the pixels and interconnection pattern do not exist instead of the array substrate 12, the reflection layer 14 is formed on the scintillator layer 13, and the moistureproof body 15 is formed to measure the luminance and resolution (CTF) characteristics. In the method for measuring the luminance and resolution characteristics, the X-ray is incident from the side of the moistureproof body 15, and the X-ray image is photographed from the glass substrate side with a CCD camera while focusing on an interface between the glass substrate and the scintillator layer 13. The simple evaluation method with the CCD camera is possibly adopted in the array substrate 12. However, when the array substrate 12 is used, the image is hardly observed from the back side of the substrate with the CCD camera because the pixels and the interconnection pattern disturb the observation (although the observation is not impossible like part of the following example). Therefore, the glass substrate having no pattern is used. The resolution (CTF) that is the important characteristic can also sufficiently be evaluated by the simple method. An X-ray quality condition was set to 70 KVp that is equivalent to an RQA-5 condition, the luminance was luminance relative to an intensifying screen (HG-H2 Back, product of Fujifilm Corporation), and the resolution was obtained through image processing of CTF (Contrast Transfer Function) value=CTF (2 Lp/mm) % from 2 Lp/mm of a resolution chart image.

A first example will be described below.

In the scintillator layer 13, a 25-mm square CsI:Tl film (thickness of 600 μm) was formed on the 40-mm square glass substrate by a vacuum evaporation method. In the reflection layer 14, coating solution in which $TiO_2$ sub-micrometer powders, a binder resin, and a solvent were mixed was applied onto the scintillator layer 13 and dried. The Al alloy foil having the thickness of 80 μm was pressed into a structure in which the flange portion 33 having the width of 5 mm is provided in the peripheral portion, thereby forming the moistureproof body 15 into the hat shape. The adhesion layer 34 was applied to the whole periphery of the flange portion 33 of the moistureproof body 15 with a dispenser, and the moistureproof body 15 adhered to the glass substrate in which the scintillator layer 13 and the reflection layer 14 were formed. The adhesion layer 34 was formed using both a thermosetting adhesive agent and an ultraviolet curable adhesive agent, which are commercially available.

A structure in which a poly-paraxylene CVD film (thickness of 20 μm) was used as a prevention structure and a structure in which an aluminum plate having a thickness of 1 mm adhered to an upper surface of an aluminum frame while a lower surface of the aluminum frame enclosing the periphery of the scintillator layer 13 adhered to the glass substrate were experimentally produced for the purpose of comparison. The material of the adhesive agent was identical to that of the first example.

Figure 4:
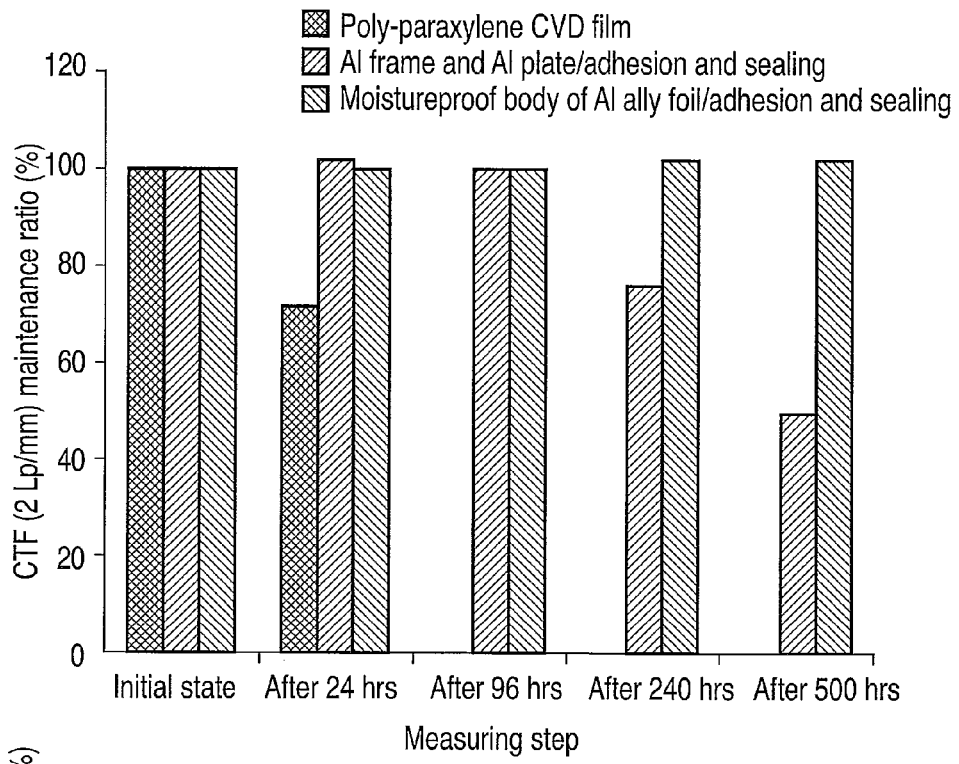
FIG. 4 is a graph illustrating a resolution maintenance ratio by a 60° C.-90% RH high-temperature and high-humidity test in each type of a moistureproof structure.

The samples were subjected to the 60° C.-90% RH high-temperature and high-humidity test to trace the changes in luminance and resolution. As a result, as illustrated in FIG. 4, in the sample in which the poly-paraxylene CVD film was used, the CTF (2 Lp/mm) value that was the resolution index was decreased to about ⅔ of the initial value after 24 hours. On the other hand, in the sample in which the moistureproof body 15 was used, the CTF (2 Lp/mm) value was hardly changed from the initial value even after 500 hours. In the sample in which the moistureproof structure was formed by the aluminum frame and the aluminum plate, the decrease in CTF was double the sample in which the moistureproof body 15 was used. Because the 1-mm aluminum plate was used in the moistureproof structure, the values of the luminance and DQE (0 Lp/mm) were substantially decreased by about 9% of the X-ray absorption.

Thus, the moistureproof body 15 that includes the flange portion 33 in the periphery thereof while having such a depth as to contain the scintillator layer 13 is used, and the flange portion 33 of the moistureproof body 15 and the array substrate 12 adhere to each other in the sealed manner by the adhesion layer 34. Therefore, the structure in which most of the scintillator layer 13 is covered with the moistureproof body 15 at a level at which the moisture transmission is substantially ignorable can be formed.

Additionally, because the flange portion 33 of the moistureproof body 15 is used as a adhesion portion, the thin adhesion layer 34 is formed between the adhesion layer 34 and the array substrate 12 to suppress the moisture transmission sectional area to a small size, and the width of the adhesion layer 34 can widely be secured to a degree of the width of the flange portion 33. Additionally, in the moistureproof body 15 made of the Al alloy, or in the moistureproof body 15 having a laminated structure of a fifth example, the moistureproof body 15 is sufficiently formed when having the thickness (about 20 to about 30 µm or more) to an extent that a pinhole is not generated, so that a loss of the X-ray absorption can be suppressed to an extremely small level. Accordingly, the X-ray detector 11 in which the moisture transmission from the adhesion layer 34 is suppressed to the minimum can be realized with the extremely small loss of the X-ray absorption and high detection ability.

At this point, a moisture transmission ratio will be described using an approximation equation. The moisture transmission ratio of the whole of the moistureproof structure including the moistureproof body 15 and the adhesion layer 34 is substantially expressed by an equation 1. At this point, in the structure of the first example, Q (moistureproof body) of a first term of the equation 1 indicates a moisture transmission ratio from the moistureproof body 15 that occupies most of the moistureproof structure, and the moisture transmission ratio can substantially be suppressed to a zero level. In the structure of the first example, Q (adhesion layer) of a second term of the equation 1 is also suppressed to an extremely low level. In an equation 2 in which Q (adhesion layer) of the second term of the equation 1 is broken down, the width W of the adhesion layer 34 is increased by effectively utilizing the flange portion 33 as described above, and the adhesion layer 34 is formed between the flat flange portion 33 of the moistureproof body 15 and the array substrate 12, so that a thickness T of the adhesion layer 34 can be suppressed to requisite minimum. Accordingly, T (thickness of adhesion layer 34)/W (width of adhesion layer 34) can be suppressed to an extremely low value.

$$Q(\text{Total}) = Q(\text{moistureproof body}) + Q(\text{adhesion layer}) \quad \text{equation 1}$$

$$Q(\text{adhesion layer}) = P(\text{adhesion layer}) \cdot S(\text{adhesion layer})/W(\text{adhesion layer}) = P(\text{adhesion layer}) \cdot L(\text{adhesion layer}) \cdot T(\text{adhesion layer})/W(\text{adhesion layer}) \quad \text{equation 2}$$

Q: moisture transmission ratio
P: moisture transmission coefficient of adhesion layer 34
S: moisture transmission sectional area of adhesion layer 34
W: width of adhesion layer 34
L: peripheral length of adhesion layer 34
T: thickness of adhesion layer 34

Then a second example will be described.

The 25-mm square CsI:Tl film (600 µm) was formed on the 40-mm square glass substrate. The moistureproof body 15 was made of the Al alloy having the thickness of 0.1 mm. In the adhesion layer 34, an inorganic filler material such as $Al_2O_3$ and $SiO_2$, which had a thickness lower than that of the adhesion layer, was added to the resin material. The spherical, scale-like, or rod-shape filler material having a typical size of several micrometers to several tens of micrometers was added, and the material, the shape, and a content ratio are properly adjusted by an adhesive agent manufacturer. Generally, in the same content ratio (weight content ratio), preferably the size of the filler material is decreased (to an extent that secondary aggregation is not generated) and the number of filler particles is increased. The moisture transmission coefficient can be decreased with increasing content ratio of the filler material within a range where the gap is not generated while the adhesion performance and the application characteristic are maintained.

In the adhesive agent used in the adhesion layer 34 of the second example, the moisture transmission coefficient at 60° C.-90% RH is suppressed to as low as about 2 g·mm/(m²·day). A commercially available epoxy seal material having the moisture transmission coefficient of 15 g·mm/(m²·day) under the same condition and a commercially available silicone seal material having the moisture transmission coefficient of 25 g·mm/(m²·day) were used as comparative examples. In the second example and comparative examples, the adhesion layer 34 had the thickness of about 270 µm and the width of about 5 mm.

Figure 5:
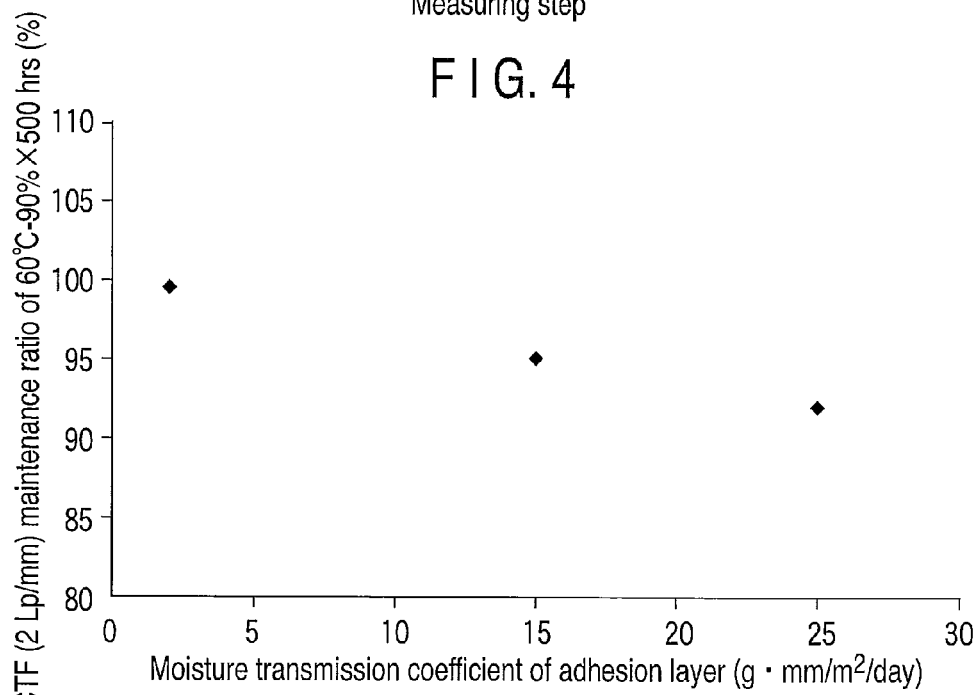
FIG. 5 is a graph illustrating a relationship between a moisture transmission coefficient of an adhesion layer material and a moistureproof effect.

As a result of the 60° C.-90% RH×24 h high-temperature and high-humidity test, as illustrated in FIG. 5, the decrease in resolution corresponds substantially to the value of the moisture transmission coefficient of the adhesive agent. That is, the second example having the moisture transmission coefficient of 2 g·mm/(m²·day) has the highest resolution maintenance ratio, and the epoxy seal material having the moisture transmission coefficient of 15 g·mm/(m²·day) has the second highest resolution maintenance ratio, and the silicone seal material having the moisture transmission coefficient of 25 g·mm/(m²·day) has the lowest resolution maintenance ratio.

As to an effect of the filler material, a moisture transmission path is restricted in the adhesion layer 34 so as to obtain the substantial reduction of the moisture transmission sectional area and extension of a moisture transmission distance. An effective value of the moisture transmission coefficient P (adhesion layer) of the equation 2 can be decreased by the effect of the filler material.

Then a third example will be described.

Al alloy foil having the thickness of 0.1 mm was used as the moistureproof body 15. In the adhesion layer 34, the inorganic filler material such as $Al_2O_3$ and $SiO_2$, which had the thickness lower than that of the adhesion layer, was added to the resin material. The adhesion layers 34 were experimentally produced by changing the substantially average width W and the substantially average thickness T in several ways.

Figure 6:
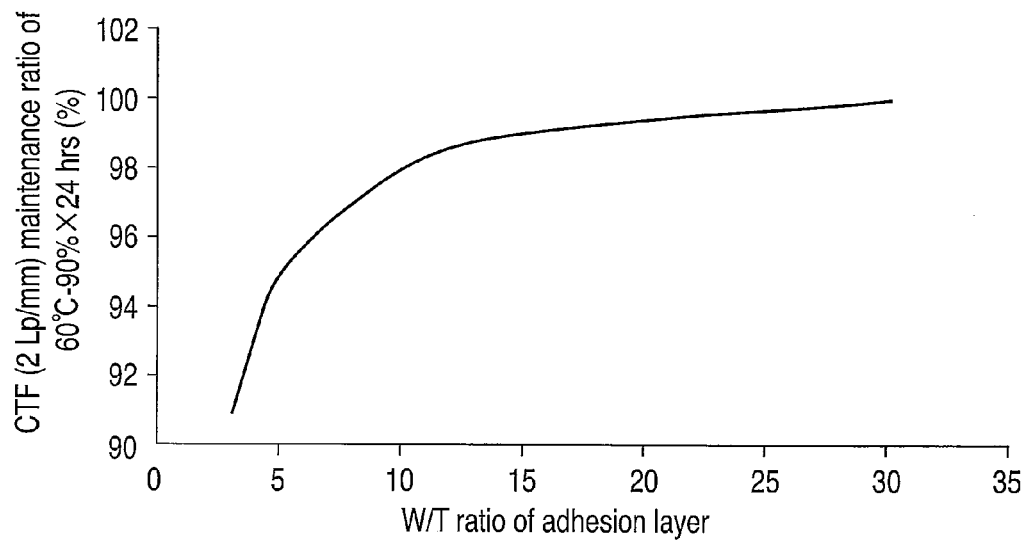
FIG. 6 is a graph illustrating a relationship between a W/T ratio of an adhesion layer and moistureproof performance.

As illustrated in FIG. 6, in the 60° C.-90% RH high-temperature and high-humidity test, a resolution degradation rate (for example, a time taken for the resolution to reach about 90% of the initial value) is increased substantially in proportion to the average thickness T (degradation becomes faster) for the same average width W. Further, the degradation rate is decreased substantially in inverse proportion to the average width W for the same average thickness T. It is said from the results that the moistureproof structure in which the resolution degradation is particularly suppressed is realized in the region of W>>T. Specifically, W/T>10 provides an indication of the moistureproof structure.

Then a fourth example will be described.

The foil made of Al alloy A3004-H0 was used as the moistureproof body 15. In the moistureproof body 15, as illustrated in FIGS. 2A and 2B, the thin material having the thickness of 0.1 mm was pressed to a depth of about 1 m, and the flange portion 33 that was a flat portion (adhesive portion) having the width of about 5 mm was formed in the periphery.

The 60° C.-90% RH moisture transmission ratio of the A3004-H0 foil (thickness of 0.1 mm) used in pressing of the moistureproof body 15 was 0.2 g/m²/day or less (0.02 g·mm/m²/day or less in terms of moisture transmission coefficient). The Al (aluminum) or various Al alloys can similarly be used as the foil material in order to form the moistureproof body.

Figure 7:
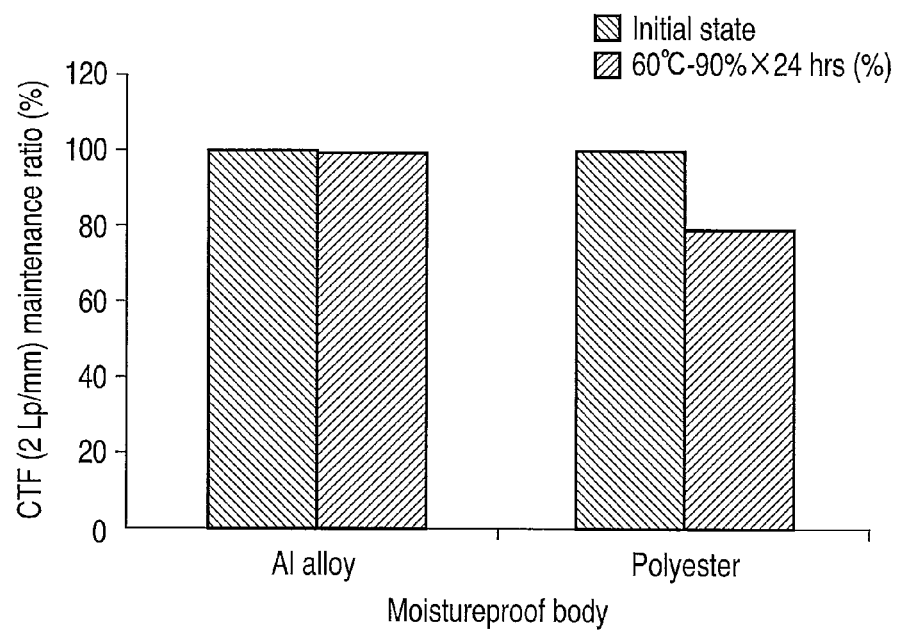
FIG. 7 is a graph illustrating a relationship between a moistureproof body material and the resolution maintenance ratio.

The moistureproof body 15 was used, and the adhesion layer 34 having the thickness of several tens of micrometers and the width of about 5 mm was experimentally produced using an ultraviolet curable adhesive agent to which the filler material was added. As can be seen from FIG. 7, the fourth example is dramatically excellent in the 60° C.-90% RH characteristic maintenance ratio, when compared with a resin moistureproof body (formed by a polyester film having the thickness of 0.1 mm and the moisture transmission coefficient=7.4 g·mm/m$^2$/day) experimentally produced for the purpose of comparison.

From the viewpoint of moistureproof performance, Al or the Al-alloy foil of the moistureproof body 15 is enough to have the thickness of about 20 μm or more. However, desirably Al or the Al-alloy foil of the moistureproof body 15 has the thickness of about 30 μm or more in consideration of a pinhole risk. On the other hand, the loss of the X-ray absorption is increased when the thickness of Al or the Al-alloy foil of the moistureproof body 15 is excessively increased. Although depending on the application of the X-ray detector 11 or X-ray energy, for the X-ray corresponding to RQA-5, the X-ray absorption is suppressed to about 2% or less when Al or the Al-alloy foil of the moistureproof body 15 has the thickness of about 0.2 mm or less. When the low-energy X-ray is detected in the applications of mammography and the like, desirably the thickness of the moistureproof body 15 is suppressed as much as possible within a range where the moistureproof characteristic can be secured.

The similar effect is obtained, not only when the moistureproof body 15 is formed by the Al-alloy foil, but also when the moistureproof body 15 that is made of either Al or Al alloy is formed in the form of either foil or the thin plate.

Then a fifth example will be described.

A laminated film in which PET that is the resin material and Al$_2$O$_3$ (actually Al$_2$O$_x$ is similarly used) were laminated was used as the moistureproof body 15. In the production of the moistureproof body 15, spray and drying of the resin material and sputtering deposition of Al$_2$O$_3$ were repeated on a hat-shaped die having a good mold releasing characteristic, thereby increasing the number of laminated layers.

The comparison of the moistureproof performance was performed by changing the thickness of PET, the thickness of the Al$_2$O$_3$ sputtered film, and the number of laminated layers of PET and the Al$_2$O$_3$ sputtered film. For the moistureproof performance, the moisture transmission ratio at 60° C.-90% RH was measured by a cup method.

Figure 8:
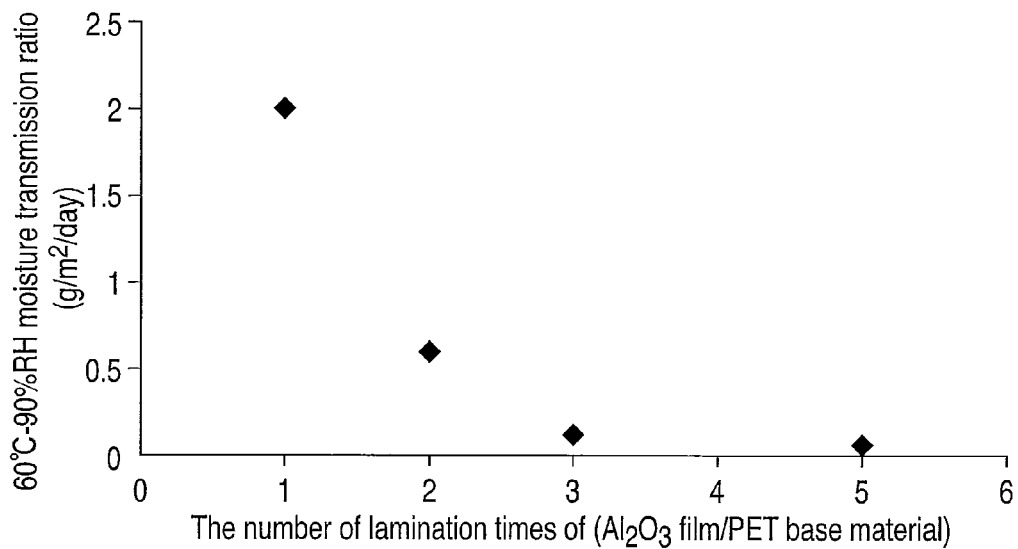
FIG. 8 is a graph illustrating a relationship between a moisture transmission ratio and the number of lamination times of the moistureproof body of the laminated structure.

As illustrated in FIG. 8, when the PET layer is identical to the Al$_2$O$_3$ layer in the thickness, the moisture transmission ratio is reduced as the number of lamination times is increased, and the moisture transmission ratio tends eventually to be kept constant to a measurement lower limit or less. In this example, the laminated film in which the Al$_2$O$_3$ sputtered film having the thickness of 3 μm was deposited on the PET base material having the thickness of 10 μm was repeatedly formed. As to the number of lamination times, the moisture transmission ratio is particularly reduced when the total number of inorganic films is three or more.

For the same number of lamination times, the moisture transmission coefficient is reduced when the thicknesses of the PET and Al$_2$O$_3$ layers are increased. For the same total thickness of PET and Al$_2$O$_3$ within the range of experimentally produced layer thickness, the moisture transmission coefficient is decreased when the number of lamination times is increased while the thickness of one layer of each of PET and Al$_2$O$_3$ is thinned. The moisture transmission coefficient is reduced by increasing the number of lamination times or the thickness because a moisture transmission resistance is simply increased in the total of the layers. When the number of lamination times is increased for the same total thickness, it is considered that the moisture transmission coefficient is suppressed to a lower level because the pinhole or a micro leak path is divided between the laminated layers.

In the experimental production in which the laminated film is used as the moistureproof body 15 while the ultraviolet curable adhesive agent to which the filler material is added is used as the adhesion layer 34, the degradation of the resolution becomes faster with increasing moisture transmission ratio of the whole of the laminated film. On the other hand, when the total thickness of the inorganic film such as Al$_2$O$_3$ and SiO$_2$ is increased, the loss of the X-ray absorption is also increased. Therefore, desirably the inorganic film has the total thickness of about 0.2 mm or less, for example, for the irradiation condition of the X-ray corresponding to RQA-5.

The resin material is not limited to PET, but various resin materials can similarly be used as long as no trouble exists in a molding characteristic and an adhesion characteristic of the inorganic film. The inorganic film is not limited to Al$_2$O$_3$, but SiO$_x$, Si—O—N, Si—Al—O—N, and thin-film materials used in the moistureproof layer or protective layer of an electronic device can similarly be used. That is, the laminated structure of the inorganic film such as the oxide film, the nitride film, and the oxynitride film of a light element such as Si and Al, or the light-metal thin film of Al or Al alloy and the resin material can be used.

Then a sixth example will be described.

When the Al or Al-alloy thin film was used as the inorganic film laminated with the resin material like the fifth example, the case where a ground potential at the circuit interconnection connected from the signal line of the array substrate 12 is electrically connected to the moistureproof body 15 was compared with the case where the ground potential is not electrically connected to the moistureproof body 15. Because the comparison evaluation is accompanied by noise measurement, the comparison evaluation was performed using the actual array substrate 12. A 9-inch square equivalent size was used as the array substrate 12, and the CsI:Tl film having the thickness of about 600 μm was deposited as the scintillator layer 13. The Al-alloy moistureproof body 15 was placed on the array substrate 12 such that the whole of the scintillator layer 13 was covered therewith, and the flange portion 33 of the moistureproof body 15 was sealed using the ultraviolet curable adhesive agent. A shielded line was used to electrically connect the moistureproof body 15 and the ground potential at the circuit interconnection, and a conductive paste was used to electrically connect the Al alloy of the moistureproof body 15 and the shielded line.

As a result of study of a noise characteristic of the array substrate 12, in the sample in which the moistureproof body 15 and the ground of the circuit of the array substrate 12 are electrically connected, the low noise characteristic is obtained compared with the sample in which the moistureproof body 15 and the ground of the circuit of the array substrate 12 are not electrically connected. This is attributed to the fact that the moistureproof body 15 acts as the shield with which the whole of the array substrate 12 is covered to prevent the invasion of an electromagnetic noise from the outside.

In the sixth embodiment, the ground of the circuit and the moistureproof body 15 are electrically connected. The circuit side is not always limited to the ground, but the similar effect is obtained by electric connection to a constant potential.

Then a seventh example will be described.

Although depending on the material of the moistureproof body 15, the fluorescence reflection performed by the moistureproof body 15 decreases the resolution characteristic while increasing the luminance characteristic. Particularly the fluorescence reflection of the moistureproof body 15 has a large influence when the moistureproof body 15 is made of a metallic material such as Al or the Al alloy. In the applications of the X-ray detector 11 and the like, usually a higher priority is desirably given to the resolution characteristic while the luminance is suppressed.

The moistureproof body 15 was made of Al having the thickness of 0.1 mm, and a fluorescence-absorbing layer that absorbs the fluorescence was provided at least inside the moistureproof body 15, that is, in the surface opposite the scintillator layer 13. A fluorescence-absorbing layer to which a black alumite treatment was performed as a blackening treatment and a fluorescence-absorbing layer in which a light-absorbing sheet was disposed were experimentally produced. A sample in which the fluorescence-absorbing layer did not exist was used as a comparative example.

Figure 9:
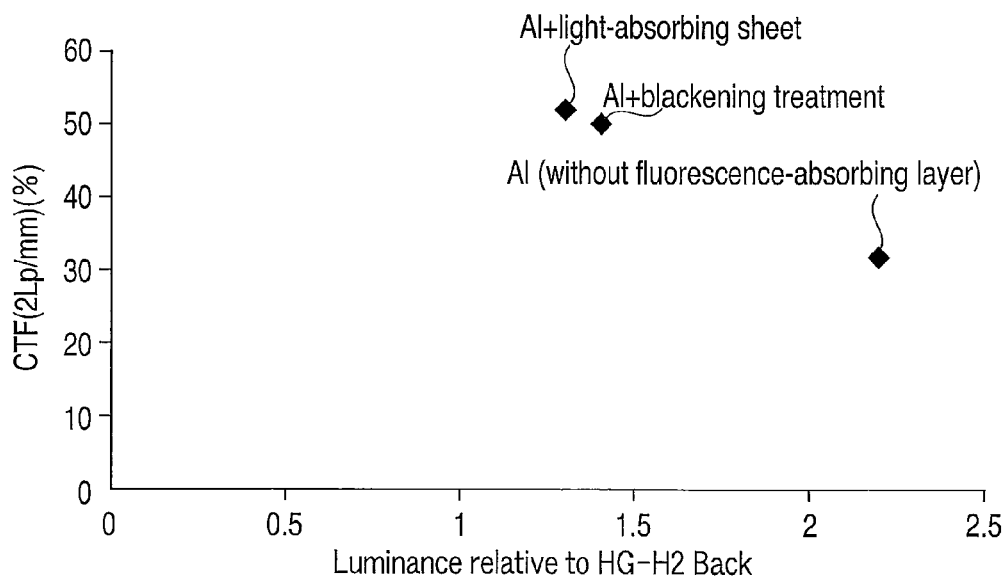
FIG. 9 is a graph illustrating a relationship between resolution and the presence or absence of a fluorescence-absorbing layer of the moistureproof body.

As can be seen from FIG. 9, compared with the X-ray detector 11 in which the fluorescence-absorbing layer did not exist, the X-ray detector 11 in which the black alumite treatment was performed to the moistureproof body 15 and the X-ray detector 11 in which the light-absorbing sheet was used as the moistureproof body 15 are excellent in resolution characteristic although the luminance is low.

The fluorescence-absorbing layer darkened or colored to absorb the fluorescence or the sheet darkened or colored to absorb the fluorescence can be used, and the similar effect is obtained.

Then an eighth example will be described.

The CsI:Tl film having the thickness of 600 μm was deposited on the glass substrate. The reflection layer 14 containing the sub-micrometer-size $TiO_2$ powder and the binder resin was formed with the thickness of about 100 μm on the CsI:Tl film. The moistureproof body 15 was made of the A3004-H0 Al alloy having the thickness of 0.1 mm. The moistureproof body 15 in which the reflection layer 14 was not provided was used as a comparative example.

Figure 10:
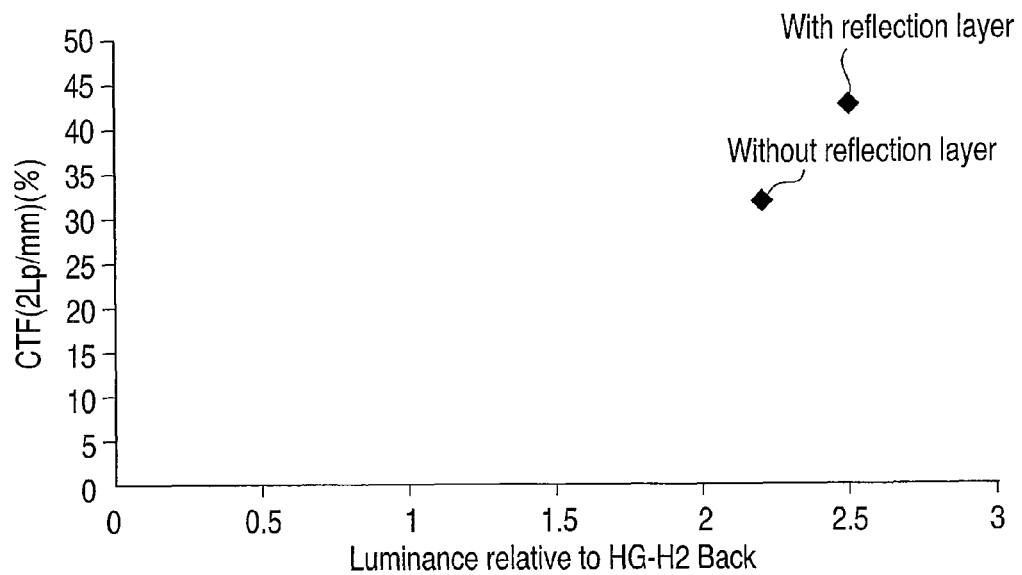
FIG. 10 is a graph illustrating a relationship between the resolution and luminance by the presence or absence of a reflection layer.

As illustrated in FIG. 10, compared with the comparative example, the X-ray detector 11 of the eighth example in which the reflection layer 14 is provided is excellent in the luminance characteristic and the resolution characteristic. This is attributed to the fact that, because the reflection layer 14 is formed in close contact with the scintillator layer 13 of the CsI:Tl film, there is no gap between the scintillator layer 13 and the reflection layer 14, and the fluorescence scattering or spread of the reflected light, caused by the gap, is effectively suppressed to the minimum. Therefore, the decrease in resolution is suppressed to the minimum while the high luminance is obtained by the reflection layer 14. For the comparative example in which the reflection layer 14 brought into close contact with the scintillator layer 13 does not exist, the resolution is decreased because the light reflected by the moistureproof body 15 spreads in the distance by the gap 35 between the scintillator layer 13 and the moistureproof body 15.

Figure 13:
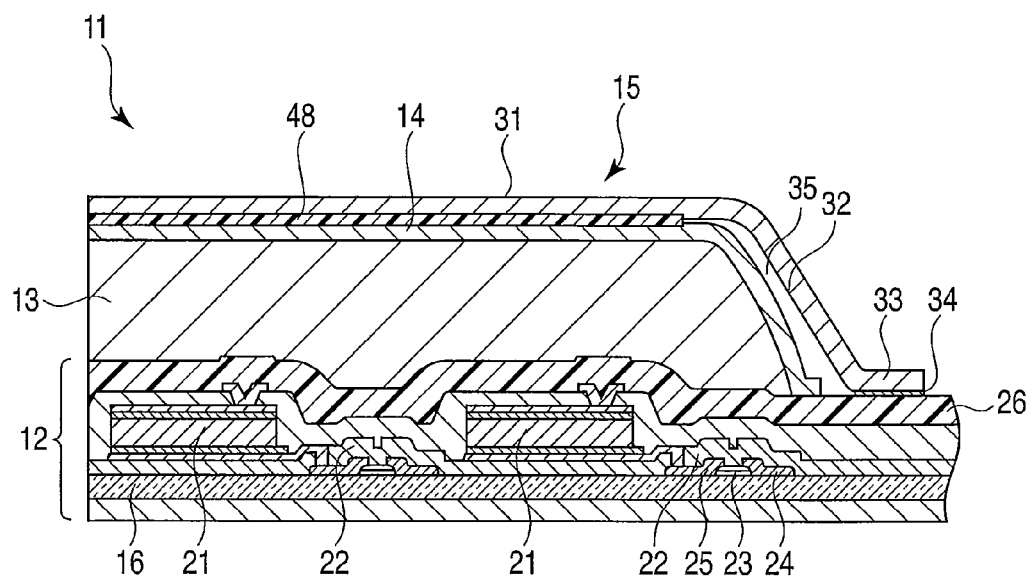
FIG. 13 is a sectional view illustrating a radiation detector according to an embodiment.

Then ninth and tenth examples will be described with reference to FIG. 13.

The CsI:Tl film having the thickness of 600 μm was used as the scintillator layer 13. An example in which the reflection layer 14 containing the $TiO_2$ powder and the binder resin was formed in close contact with the scintillator layer 13 and an example in which the reflection layer 14 did not exist were produced. A silicone resin buffer sheet 48 (thickness of 0.2 mm) was placed on the reflection layer 14 or the scintillator layer 13 of the examples. The moistureproof body 15 made of the A3004-H0 Al alloy was placed such that the scintillator (and reflection film 14) was covered therewith, and the flange portion 33 of the moistureproof body 15 and the array substrate 12 adhered to each other using the ultraviolet curable adhesive agent. Comparative examples that did not include the buffer sheets 48 were produced for the examples in which the reflection layer 14 was provided and not provided.

A reduced-pressure cycle test (repetition of 1 atmosphere and 0.5 atmosphere was performed 100 times) and a thermal shock test (30 cycles of −15° C.×30 minutes/45° C.×30 minutes) were performed as a reliability test. In each example including the buffer sheet 48, an anomaly such as a crack was not generated in the inside film (scintillator layer 13 or reflection layer 14). In each comparative example, as a result of the breakdown investigation, it was found that a micro crack was generated.

This is attributed to the following facts. That is, the shock caused by deformation of the moistureproof body 15 is alleviated during the reduced-pressure test by inserting the buffer sheet 48 of the tenth example, and the buffer sheet 48 acts as a heat-insulating layer during the thermal shock test. Therefore, the rapid temperature change of the reflection layer 14 or the scintillator layer 13 is suppressed to prevent the generation of the crack or the like.

Then an eleventh example will be described.

Figure 11:
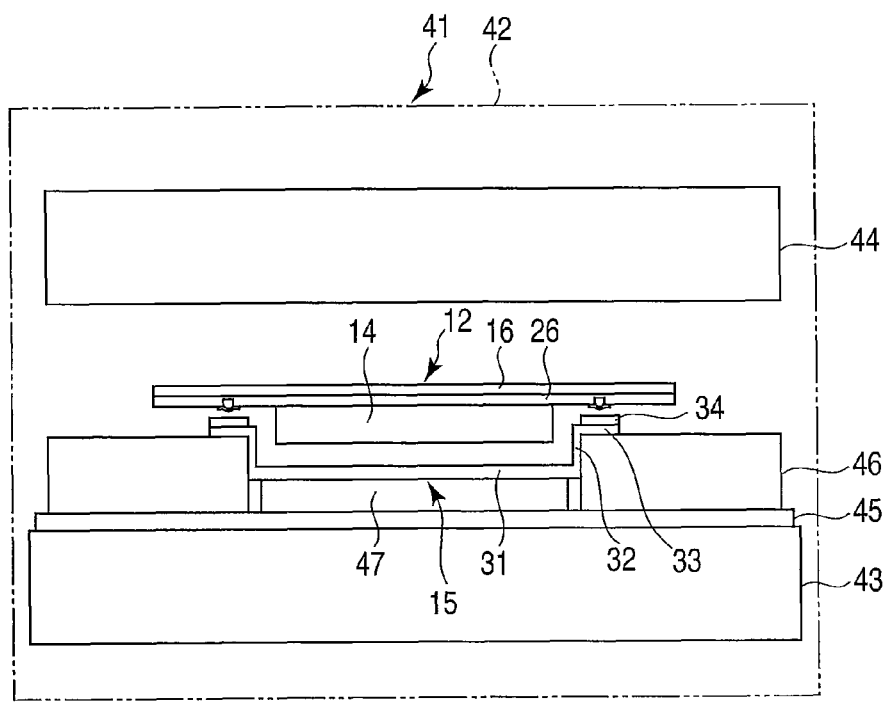
FIG. 11 is a sectional view of a pressure reducing and pressurizing apparatus.

Although the production process is similar before the moistureproof body 15 is formed, the adhesion and sealing are performed in a reduced-pressure state in forming the moistureproof body 15 using a pressure reducing and pressurizing apparatus 41 of FIG. 11.

The pressure reducing and pressurizing apparatus 41 comprises a chamber 42 in which the pressure can be reduced, a lower stage 43 that is disposed in the chamber 42, and an upper stage 44 that can be opened and closed to the lower stage 43. A circular adhesion jig 46 is disposed on the lower stage 43 with a cushion sheet 45 interposed therebetween, and a height adjusting sheet 47 is disposed inside the adhesion jig 46.

First, the hat-shaped moistureproof body 15 made of the A3004-H0 Al alloy having the thickness of 0.1 mm is placed upside down on the adhesion jig 46, the adhesive agent is applied to the peripheral flange portion 33, and the array substrate 12 in which the scintillator layer 13 and the reflection layer 14 are formed is also placed upside down on the moistureproof body 15.

After the pressure in the chamber 42 is reduced, the moistureproof body 15 and the array substrate 12 are united and pressurized between the lower stage 43 and the upper stage 44. At this point, a pressurizing force was set to 10 N (about 0.1 Kg) per 1 cm in a peripheral adhesion portion, and the pressurizing force was retained for several tens of seconds.

After the chamber 42 was opened to the air to release the pressurizing force, the moistureproof body 15 was taken out such that the reduced-pressure state in the moistureproof body 15 was not broken, and the adhesion portion was exposed and irradiated with the ultraviolet ray emitted from the ultraviolet lamp, thereby curing the adhesive agent. As to an irradiation amount of the ultraviolet ray, an integral irradiation amount of the 360-nm ultraviolet ray became about 7 $J/cm^2$. The heating treatment was performed for one hour in an oven at 80° C. in order to promote the curing.

Several samples were experimentally produced while the reduced-pressure condition is changed from 0.1 to 0.9 atmosphere with 0.1-atmosphere increments.

For the produced samples, the gap volume in the moistureproof body 15 was obtained by subtracting the volume of the infill such as the scintillator layer 13 and the reflection layer 14 from the inside volume of the moistureproof body 15. The inside volume of the moistureproof body 15 was determined from the outer shape. When the pressure of the periphery is reduced to 0.1 atmosphere or less, the gap volume in the moistureproof body 15 was obtained by subtracting the volume of the infill such as the scintillator layer 13 and the reflection layer 14 from the volume in which the A3004-H0 hat-shaped moistureproof body 15 was swelled to the maximum.

As a result of the reduced-pressure test of the samples, the A3004-H0 hat-shaped moistureproof body 15 was swelled according to the reduced-pressure degree of the periphery. In the reduced-pressure state in which the A3004-H0 hat-shaped moistureproof body 15 was swelled to the maximum, it is considered that a force corresponding to pressure difference between the inside and the outside is applied to the adhesion layer 34 in the periphery of the moistureproof body 15. It is necessary to secure the reliability of the adhesion layer 34 as the usually required condition in the repetition of the atmospheric pressure and the reduced-pressure state of about 0.5 atmosphere that is assumed to be aircraft transportation. As a result of the test in which a cycle of 1 atmosphere and the reduced pressure of 0.5 atmosphere is repeated 20 times, the adhesion layer 34 was not broken in the sample in which the reduced-pressure sealing was performed on the reduced-pressure condition of about 0.5 atmosphere or less. In the sample in which the reduced-pressure sealing was performed on the reduced-pressure condition of about 0.5 atmosphere or less, the volume of the gap 35 in the moistureproof body 15 was about ½ or less at 1.0 atmosphere (state in close contact with the internal structure by the atmospheric pressure) compared with the pressure of the periphery of the moistureproof body 15 being reduced to 0.1 atmosphere (state in which the moistureproof body 15 was swelled to the maximum).

Then a twelfth example will be described.

In the twelfth example, it is necessary to evaluate the curing state of the ultraviolet curable seal material by irradiating the ultraviolet curable seal material with the ultraviolet ray from the substrate back side in which the pixels and interconnection pattern exist. Therefore, the array substrate 12 including the circuit interconnections of the control line 18 and data line 19 in the periphery was used. The scintillator layer 13 made of the CsI:Tl film (thickness of 600 μm) and the reflection layer 14 were formed similarly to the first to eleventh examples. The A3004-H0 hat-shaped Al alloy foil having the thickness of 0.1 mm was used as the moistureproof body 15, and the moistureproof body 15 adhered to the array substrate 12 in the sealed manner using a cationic polymerization type epoxy ultraviolet curable adhesive agent (XNR-5516ZHVB-1, product of Nagase Chemtex Corporation). As comparative examples, a radical polymerization type acrylic ultraviolet curable adhesive agent and a thermosetting adhesive agent (T832/R101 B-1, product of Nagase Chemtex Corporation) is used as an adhesive agent.

After the predetermined amount of adhesive agent was applied to the flange portion 33 of the moistureproof body 15 with the dispenser, the adhesive agent is united with the array substrate 12. The ultraviolet curable adhesive agent was irradiated with an ultraviolet amount corresponding to each recommended condition while the close contact was retained by pressurizing the adhesion portion. Because the ultraviolet ray was not transmitted from the side of the moistureproof body 15, the ultraviolet curable adhesive agent was irradiated with the ultraviolet ray from the back side of the array substrate 12. After the ultraviolet irradiation, the heating treatment was performed at 60° C. for 3 hours in order to promote the curing reaction. For the thermosetting adhesive agent, the heating treatment was performed at 80° C. for 1 hour under the recommended condition while the close contact was retained by pressurizing the adhesion portion.

In the sample in which the thermosetting adhesive agent was used, a phenomenon in which the surface of the array substrate 12 was warped in a concave manner was generated in returning to room temperature. This is attributed to the fact that, because the moistureproof body formed by the Al-alloy foil and the array substrate adhered to each other and were fixed in the heated state at 80° C., the phenomenon is generated by a thermal expansion coefficient difference between the glass substrate 16 of the array substrate 12 and the Al alloy foil and the epoxy resin of the adhesive agent due to a temperature difference in returning to room temperature. The Corning 1737 glass substrate (thickness of 0.7 mm) used in the experimental production has the thermal expansion coefficient of about 3.8 ppm/deg, the AL alloy foil has thermal expansion coefficient of 24 ppm/deg, and the epoxy resin has the thermal expansion coefficient of about 24 ppm/deg. The expansion difference of about 0.55 mm is generated when the temperature difference of 60° C. exists in the 45-cm square size. Although the warp amount depends on the position, the maximum gap of about 1 mm was generated in the peripheral portion of the array substrate 12. The gap causes a welding position shift between FPC and Pad during TAB welding of the periphery of the substrate in the subsequent process, or the gap is generated in the back side of the array substrate 12 to cause degradation of a radiation characteristic during mounting.

On the other hand, for the two types of the ultraviolet curable adhesive agents, the heating treatment was performed at 60° C. for 3 hrs after the ultraviolet curing at room temperature. The warp was hardly generated in returning to room temperature. Obviously the warp was not generated in the sample to which the heating treatment was not performed.

Figure 12:
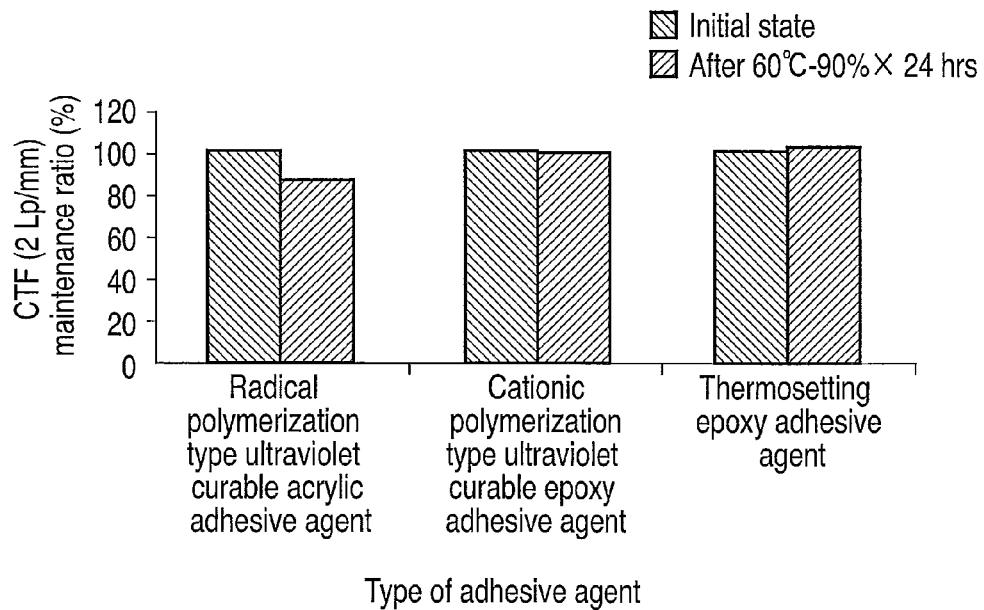
FIG. 12 is a graph illustrating a resolution maintenance ratio by a 60° C.-90% RH high-temperature and high-humidity test in each type of an adhesive agent.

The 60° C.-90% RH high-temperature and high-humidity test was performed as comparison of the sealing characteristic. As a result, as illustrated in FIG. 12, in the ultraviolet curable adhesive agents, samples in which the cationic polymerization type epoxy adhesive agent and the thermosetting epoxy adhesive agent were used had the excellent resolution (CTF) maintenance ratio. On the other hand, the resolution (CTF) degradation possibly caused by the moisture transmission was observed in the sample in which the radical polymerization type acrylic adhesive agent was used. In the cationic polymerization type ultraviolet curable adhesive agent, it is considered that, because generally a terminal reaction does not exist, the curing reaction propagates to the shadow portion formed by the interconnection circuit pattern of the array substrate 12 during the ultraviolet irradiation and the ultraviolet curing is wholly performed irrespective of the presence or absence of the interconnection circuit pattern of the array substrate 12. On the other hand, in the radical polymerization type ultraviolet curable adhesive agent, it is estimated that, because the terminal reaction exists, a cross-linking reaction does not proceed in the shadow portion that the ultraviolet ray does not reach in the array substrate 12 including the interconnection circuit pattern, and therefore the sufficient adhesion characteristic and moistureproof performance are not obtained.

The CTF (2 Lp/mm) measurement through the array substrate 12 including the pixel and interconnection pattern is performed by the X-ray image measurement through the gap between the pixel patterns. The measurement can be performed by image processing in which the X-ray image with the resolution chart is divided by the X-ray image without the resolution chart. Although an absolute value of CTF becomes a deviated value unlike the case on the glass substrate that does not include the pixel and the interconnection circuit pattern, the CTF degradation characteristic of the high-temperature and high-humidity test focuses on the maintenance ratio (relative value) with respect to the initial value. Therefore, there is no particular problem in evaluating the degradation characteristic.

According to the structure and production method of the embodiments, the X-ray detector 11 having the high moistureproof reliability is obtained while the warp of the array substrate 12 is not generated.

While certain embodiments have been described, these embodiments have been presented by way of example only, and are not intended to limit the scope of inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A radiation detector comprising:
   a substrate comprising a photoelectric conversion element;
   a scintillator layer formed on the substrate to convert radiation into fluorescence;
   a hat-shaped moistureproof body comprising a flange portion along a periphery thereof while being deep enough to contain at least the scintillator layer; and
   an adhesion layer containing a different material from a material of the moistureproof body and being formed differently from the moistureproof body, the adhesion layer causing the substrate and the flange portion of the moistureproof body to adhere to each other in a sealed manner.

2. The radiation detector according to claim 1, wherein the adhesion layer contains filler particles in a resin material having a size smaller than the thickness of the adhesion layer.

3. The radiation detector according to claim 1, wherein the adhesion layer satisfies a relationship of W/T>10, where T is a substantial average thickness of the adhesion layer and W is a substantial average width of the adhesion layer.

4. The radiation detector according to claim 1, wherein the moistureproof body is made of either Al or an Al alloy in a form of either foil or a thin plate, and processed in a hat shape, and
   the adhesion layer is arranged separately from the scintillator layer, in a periphery of the scintillator layer.

5. The radiation detector according to claim 4, wherein the moistureproof body is electrically connected to at least part of a circuit interconnection formed on the substrate or a circuit board of the radiation detector.

6. The radiation detector according to claim 1, wherein the moistureproof body is formed in a laminated structure including a resin material film and either a light-element inorganic or a light-metal film, and
   the adhesion layer is arranged separately from the scintillator layer, in a periphery of the scintillator layer.

7. The radiation detector according to claim 1, wherein a fluorescence-absorbing layer that absorbs the fluorescence is provided in a surface on a side of the scintillator layer of the moistureproof body, and
   the fluorescence-absorbing layer contains a different material from the materials of the moistureproof body and the adhesion layer.

8. The radiation detector according to claim 1, further comprising a reflection layer provided between the scintillator layer and the moistureproof body to reflect the fluorescence toward a side of the substrate.

9. The radiation detector according to claim 8, further comprising a buffer sheet provided between the reflection layer and the moistureproof body.

10. The radiation detector according to claim 1, further comprising a buffer sheet provided between the scintillator layer and the moistureproof body.

11. The radiation detector according to claim 1, wherein the unoccupied volume inside the moistureproof body at 1 atm is ½ or less with respect to the unoccupied volume inside the moistureproof body in reducing a outside pressure of the moistureproof body to 0.1 atm or less.

12. A method for producing the radiation detector according to claim 1, wherein the moistureproof body and the substrate are caused to adhere to each other in the sealed manner in a reduced-pressure state.

13. The method for producing a radiation detector according to claim 12, wherein, in the adhesion layer, an ultraviolet curable adhesive agent is applied to at least either the flange portion of the moistureproof body or a surface on a side of the substrate adhering to the flange portion, the flange portion of the moistureproof body is brought into close contact with the substrate, and then either an adhesive agent is irradiated with an ultraviolet ray to cure the adhesive agent at room temperature.

14. The method for producing a radiation detector according to claim 13, wherein, the adhesive agent is further cured by heating after irradiated with the ultraviolet ray to cure the adhesive agent at room temperature.

15. The method for producing a radiation detector according to claim 13, wherein a curing reaction is generated by irradiating the adhesion layer with the ultraviolet ray from the back side of the substrate thorough opening area between circuit lines formed on the substrate using an ultraviolet curable adhesive agent in which the curing reaction proceeds by cationic polymerization.

16. The method for producing a radiation detector according to claim 1, wherein, in the adhesion layer, an ultraviolet curable adhesive agent is applied to at least either the flange portion of the moistureproof body or a surface on a side of the substrate adhering to the flange portion, the flange portion of the moistureproof body is brought into close contact with the substrate, and then either an adhesive agent is irradiated with an ultraviolet ray to cure the adhesive agent at room temperature.

* * * * *